United States Patent
Francis (10) Patent No.: US 6,189,411 B1
(45) Date of Patent: Feb. 20, 2001

(54) REAR END GEAR PUMP

(75) Inventor: G. Brad Francis, Lexington, NC (US)

(73) Assignee: American Equipment Company, Boca Raton, FL (US)

( * ) Notice: Under 35 U.S.C. 154(b), the term of this patent shall be extended for 0 days.

(21) Appl. No.: 09/261,792

(22) Filed: Mar. 3, 1999

(51) Int. Cl.$^7$ .............................. F16H 57/02; F01C 21/00; F01C 1/18

(52) U.S. Cl. .................................. 74/606 R; 074/606 A; 418/47; 418/206.1; 384/467; 417/53

(58) Field of Search ............................ 74/606 R; 418/47, 418/206.1; D15/7; 384/467, 316; 417/53

(56) References Cited

U.S. PATENT DOCUMENTS

| | | | |
|---|---|---|---|
| 1,687,523 | * 10/1928 | Staude | 418/206.1 |
| 1,834,754 | * 12/1931 | Whaley | 418/206.1 |
| 1,923,268 | * 10/1928 | Jensen | D15/7 |
| 2,082,412 | * 6/1937 | Morton | 418/206.1 |
| 2,286,816 | * 6/1942 | Kishline | 418/47 |
| 2,962,976 | * 12/1960 | Carufel | 418/206.1 |
| 3,221,663 | * 10/1928 | Schofield et al. | 418/47 |
| 3,263,425 | * 8/1966 | Rohde | 418/206.1 |
| 5,702,234 | * 12/1997 | Pieters | 417/53 |
| 5,810,571 | * 9/1998 | Cross et al. | 418/47 |
| 5,879,140 | * 3/1999 | Ellison | 418/206.1 X |
| 6,062,827 | * 5/2000 | Shu | 418/47 |

FOREIGN PATENT DOCUMENTS

566283 * 12/1944 (GB) ...................................... 418/47

* cited by examiner

*Primary Examiner*—Vinh T. Luong
(74) *Attorney, Agent, or Firm*—Dougherty & Clements LLP (57) ABSTRACT

A rear end gear pump for providing lubricant/coolant to a rear axle assembly of a racing vehicle that is removably securable to the interior of a rear axle housing. The rear end gear pump is preferably coupled to a pinion shaft of the rear axle assembly and provides lubricants/coolants to the entire rear axle assembly. The pump includes a substantially hollow pump casing for removable attachment to the interior of the rear axle housing, a pair of pump gears housed within the interior of the pump casing, an input port formed through the hollow casing for receiving lubricant/coolant into the pump, means for conducting lubricant/coolant into the pump connected to the input port, a bearing lubrication port formed through the pump casing to provide lubrication to the pinion bearing and an output port formed through the hollow casing for conducting lubricant/coolant away from the pump. One of the pair of pump gears is attachable to the pinion shaft of the rear axle assembly. The pump gears are coupled together to circulate lubricant/coolant within the interior of the pump casing and create a vacuum force to draw lubricant/coolant into the pump and out of the reservoir to an external cooler.

18 Claims, 6 Drawing Sheets

REAR END GEAR PUMP

FIELD OF THE INVENTION

The present invention relates to cooling of a rear wheel assembly, and more particularly to a rear end pump for cooling oil that is provided to a rear wheel gear assembly.

BACKGROUND OF THE INVENTION

Automobile racing has provided many years of entertainment for racing fans of all ages. With the advent of nationally recognized racing events, such as NASCAR WINSTON CUP automobile racing, BUSCH Grand National automobile racing and CRAFTSMAN Truck Racing, the financial incentive and exposure resulting from winning such events places a great deal of pressure on racing teams to outperform one another. To remain competitive, racing teams are continuously developing and building automobiles, trucks and other racing vehicles that are capable of exceeding current speeds while remaining within vehicle component tolerances and standards. For example, depending on a particular type of racing circuit, various standards have been developed by an associated governing body in order to ensure the safety of the race car drivers and provide a relatively fair ground for competition. Consequently, most racing vehicle design and development has focused on improving the work efficiency of engine components, decreasing the overall weight of the racing vehicle, simplifying the serviceability of different vehicle components and improving the operating efficiency of the racing vehicle in general. Racing vehicles require constant revision of vehicle operating systems and vehicle components in order to improve vehicle performance, and each vehicle component contributes to at least one of the aforementioned factors.

One of the primary attractions of automobile racing is the high speed at which the racing vehicles operate. The drive train components of racing vehicles operate at high revolutions per minute ("RPM") and generate tremendous amounts of heat from the friction and torque of one gear acting on another gear. Consequently, one consideration that affects the design and development of racing vehicle components is that such components must be substantially heat tolerant or have a cooling mechanism to counter the heat generated by the high RPM's. For example, in WINSTON Cup racing and most any other racing circuit, the racing vehicles are driven by rear wheel assemblies that operate at high RPM's. In particular, the differential gear assembly in a WINSTON Cup racing vehicle operates at high RPM's that are typically between about 9,000 to 10,000 RPM and at about 740 to 760 horsepower (HP). Consequently, the rear wheel assembly must be cooled.

Figure 1:
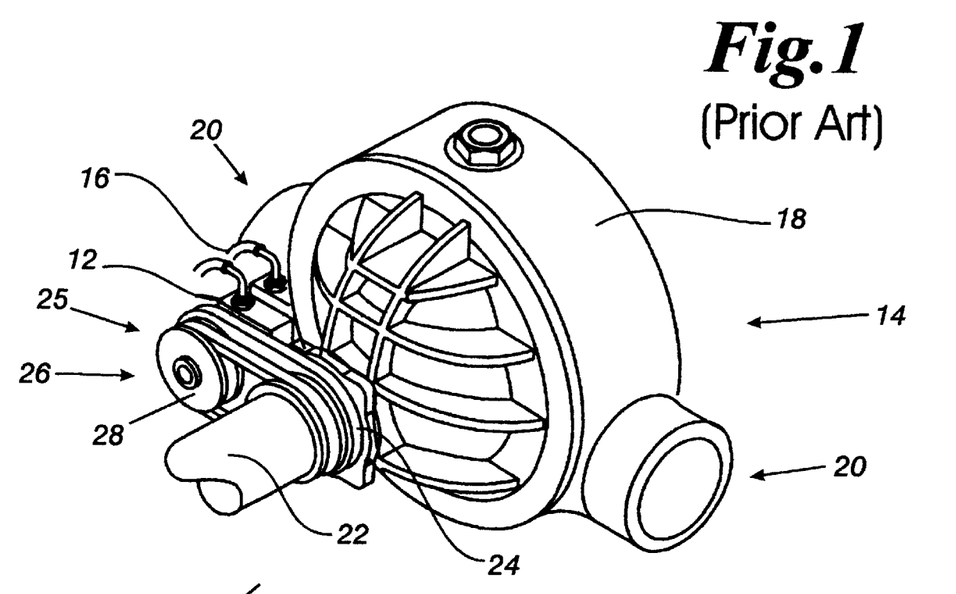
FIG. 1 is a perspective view of a conventional lubricant/coolant pump that is attached to the exterior of a rear axle assembly.

One technique of cooling a rear wheel assembly is to use a rear end lubricant/coolant pump 12 (see FIG. 1). The rear wheel assembly, shown generally at 14, includes a rear gear assembly, not shown, contained in a rear gear assembly housing 18, left and right axles, shown generally at 20, a differential gear assembly (not shown), and other conventional related sub-components, such as bearings and seals. Lubricant/coolant is held in a reservoir (not shown) located at the bottom of the rear gear assembly housing 18. During operation of the differential gear assembly, the gear assembly collects the lubricant/coolant from the reservoir and splashes the lubricant/coolant about the differential gear assembly. However, as the lubricant/coolant contacts the differential gear assembly, the heat from the differential gear assembly is transferred to the lubricant/coolant.

To cool the lubricant/coolant, the lubricant/coolant is circulated by the rear end lubricant/coolant pump 12 to an external cooler (not shown). The rear end lubricant/coolant pump 12 is externally mounted to the rear gear assembly housing 18, connected to the reservoir by tubing 16 and coupled to a drive shaft 22. In particular, the rear end lubricant/coolant pump 12 requires a pulley based system, shown generally at 26, that is coupled to the drive shaft 22 to actuate the pump 12. The rear end pump 12 is attached to a mounting plate 24 that is secured to the rear gear assembly housing 18. A belt drive, shown generally at 25, and corresponding pulleys 28 are attached to the mounting plate 24 adjacent to the pump 12 and coupled to the pump 12. As the lubricant/coolant passes through the external cooler, the heat from the lubricant/coolant is exchanged to ambient air, and the resulting cooled lubricant/coolant is returned to the reservoir. The rear end lubricant/coolant pump 12 thus becomes a vital portion of the racing vehicle's rear wheel assembly for cooling the rear wheel assembly. An example of a rear end lubricant/coolant pump that is conventionally used in the NASCAR racing series is the SCP-102 and the SCP-101 recirculation pumps manufactured by Speedway Engineering.

Unfortunately, conventional rear end lubricant/coolant pumps are cumbersome to manipulate and include multiple external components that may become faulty during races. For example, conventional rear end lubricant/coolant pumps have a weight in excess of 6.5 pounds and are coupled to the drive shaft by a standard belt drive, as previously mentioned. The mounting plate, the belt drive and associated pulleys are additional elements that require maintenance and repair. Additionally, conventional drive shafts used in racing vehicles require a machined grooved pulley for receiving the belt of the belt drive.

Another problem with conventional rear end lubricant/coolant pumps is that the pump and any connected components must be removed and reinstalled in order to change any portion of the rear differential assembly, or rear axle assembly. Determining an appropriate gear ratio is vital to a racing vehicle's performance, and the removal and reinstallation of the conventional rear end lubricant/coolant pump substantially interferes with such determination. For example, the NASCAR racing series alots racing teams a predetermined and typically brief amount of time for practice track runs. This alotted time is particularly useful for fine tuning a racing vehicle and testing different gear ratios of the rear axle assembly. Unfortunately, when exchanging and testing the rear axle gear ratios during the alotted time, removal and installation of the rear end lubricant/coolant pump is an awkward task that consumes a great amount of the alotted time. Instead of expending valuable time removing and installing conventional rear end pumps, it is preferable to spend such time running practice laps with the purpose of testing additional gear ratios.

What is therefore needed is a pump for circulating lubricant/coolant to the rear axle assembly of a racing vehicle that maximizes the performance of the racing vehicle. In particular, what is needed is a pump for circulating lubricant/coolant to the rear axle assembly of a racing vehicle that is light weight and does not require removal during race activities and gear ratio exchanges. What is further needed is a pump for circulating lubricant/coolant to the rear axle assembly of a racing vehicle that increases the fluid thermal efficiency of the pump at high operating speeds.

SUMMARY OF THE INVENTION

The present invention is a pump for circulating lubricant/coolant to a differential or axle assembly of a vehicle that maximizes the performance of the vehicle. In particular, the present invention provides a pump for circulating lubricant/coolant to a rear axle assembly of a racing vehicle that maximizes the performance of the racing vehicle. The present invention provides a pump for circulating lubricant/coolant to the rear axle assembly of a racing vehicle that is light weight and does not require removal during race activities and gear ratio exchanges. More particularly, the present invention provides a pump for circulating lubricant/coolant to the rear axle assembly of a racing vehicle that is contained in the interior of the rear axle assembly housing and allows gear ratio exchange of the rear axle assembly without removing the pump. The present invention further provides a pump for circulating lubricant/coolant to the rear axle assembly of a racing vehicle that increases the fluid thermal efficiency of the pump at high operating speeds.

In a preferred embodiment, the present invention is a rear end gear pump for providing lubricant/coolant to a rear axle assembly, such as a rear differential assembly, that is removably securable to the interior of a rear axle housing. The rear end gear pump is coupled to a pinion shaft of the rear axle assembly and provides lubricants/coolants to the entire rear axle assembly. In a basic operation, the present invention pumps lubricant/coolant that is located in the reservoir of the rear axle housing to an external cooler, and the lubricant/coolant returns back into the rear axle housing. The rear axle assembly is lubricated by splash lubrication where a lower portion of a ring gear is immersed in the lubricant/coolant found in the reservoir. As the ring gear rotates, the teeth of the ring gear collect lubricant/coolant and splash the lubricant/coolant about the axle assembly and interior of the housing. The present invention further provides lubrication to a pinion shaft bearing that is attached to the pinion shaft.

The invented rear end gear pump is particularly suited for coupling to the rear axle housing and pinion shaft of high performance racing vehicles. The rear axle housing contains the rear axle assembly which includes the pinion shaft, the pinion shaft bearing that is attached to the end of the pinion shaft, the ring gear and a differential carrier. The invented rear end gear pump comprises a substantially hollow pump casing for removable attachment to the interior of the rear axle housing, a pair of pump gears housed within the interior of the pump casing, an input port formed through the hollow casing for receiving lubricant/coolant into the pump, means for conducting lubricant/coolant into the pump connected to the input port, a bearing lubrication port formed through the pump casing to provide lubrication to the pinion bearing and an output port formed through the hollow casing for conducting lubricant/coolant away from the pump. One of the pair of pump gears is attachable to the pinion shaft of the rear axle assembly. The pump gears are coupled together to circulate lubricant/coolant within the interior of the pump casing and create a vacuum force to draw lubricant/coolant into the pump and out of the reservoir to the external cooler. A fluid line is preferably connected to the output port in order to conduct lubricant/coolant from the pump to the external cooler. The lubricant/coolant is returned to the rear axle housing from the external cooler using conventional fluid return lines.

The pump casing comprises an interior chamber for housing the pump gears and channeling lubricant/coolant therethrough and a pinion shaft engaging portion positioned adjacent to the interior chamber. In a preferred embodiment, a bearing index cavity is formed on the pinion shaft engaging portion for receiving the pinion shaft bearing. The bearing lubrication port is formed through the pinion shaft engaging portion. The pump casing includes at least two bores formed therethrough to removably secure the pump casing to the rear axle housing.

The pump gears comprise a drive gear that is mounted on a input shaft for coupling with the pinion shaft and a driven gear that is mounted on a driven gear shaft. As previously mentioned, the pump gears are coupled together, and the drive gear and driven gear are preferably positioned so that they are non-tooth tolerant with respect to one another. Because the pump gears are not tooth tolerant, when lubricant/coolant is transported by the movement of the pump gears at high RPM's, the pump gears are self cleaning.

The means for conducting lubricant/coolant into the pump comprises a substantially hollow stem having a pair of opposing ends. One of the opposing ends is attached to the input port. The other end includes a filter for preventing larger particles from entering the pump. When the pump gears are rotated by the pinion shaft, the previously mentioned vacuum created within the interior chamber of the pump casing draws lubricant coolant from the reservoir, into and through the invented pump and to the external cooler.

The bearing lubrication port provides a conduit for fluid to flow from the interior chamber of the pump casing to the bearing index cavity of the gear housing engaging portion. After the invented gear pump is coupled to the pinion shaft, the rotation of the pinion shaft actuates a rotation of the drive gear in one direction. Because the drive gear and the driven gear are coupled together, the rotation of the drive gear in one direction counter-rotates the driven gear in a direction opposite the rotation of the drive gear. Accordingly, lubricant/coolant contained within the interior chamber of the pump casing tends to flow along the perimeter of the interior chamber and towards the output port thus creating a vacuum within the interior chamber.

Typically, the pinion shaft operates at about 9,000 to 10,000 RPM's. The invented rear end gear pump allows for lubricant/coolant to be circulated from the rear axle housing to the external cooler and back to the rear axle housing where the gear assembly is cooled by "splash" lubrication. Because the invented rear end gear pump is mounted in the interior of the rear axle housing, the rear end gear pump does not need to be removed to change the rear axle assembly. The invented rear end gear pump allows for changing ratios during practice for racing events and during the racing events themselves with minimal down time.

OBJECTS OF THE INVENTION

The principal object of the present invention is to provide a pump for circulating lubricant/coolant to the rear axle assembly of a racing vehicle that maximizes the performance of the racing vehicle.

Another, more particular object of the present invention is to provide a pump for circulating lubricant/coolant to the rear axle assembly of a racing vehicle that is light weight and does not require removal during race activities and gear ratio exchanges.

Another, more particular object of the present invention is to provide a rear end gear pump that allows for changing gear ratios during practice for racing events and during the racing events themselves with minimal down time.

Another object of the present invention is to provide a pump for circulating lubricant/coolant to the rear axle assembly of a racing vehicle that increases the fluid thermal efficiency of the pump at high operating speeds.

Another object of the present invention is to provide a pump for circulating lubricant/coolant to the rear axle assembly of a racing vehicle that lubricates the pinion shaft bearing.

Another, more particular object of the present invention is to provide a pump for circulating lubricant/coolant to the rear axle assembly of a racing vehicle that is internally self-cleaning.

BRIEF DESCRIPTION OF THE DRAWINGS

The foregoing and other objects will become more readily apparent by referring to the following detailed description and the appended drawings in which.

DETAILED DESCRIPTION

The present invention is a pump for circulating lubricant/coolant to an axle assembly of a vehicle that maximizes the performance of the vehicle. In particular, the present invention provides a rear end gear pump for circulating lubricant/coolant to a rear axle assembly, or rear gear assembly, of a racing vehicle. The present invention provides a pump for circulating lubricant/coolant to the rear axle assembly of a racing vehicle that is light weight and does not require removal during race activities and gear ratio exchanges. In a preferred embodiment, the invented rear end gear pump provides lubricant/coolant to a rear differential assembly.

While the invented rear end gear pump is described in terms of incorporating the pump with a rear axle assembly, the rear end gear pump is not intended to be limited to incorporation with rear axle assemblies and may be incorporated with front axle assemblies. Further, while the invented rear end gear pump is described in terms of racing vehicles applications, the rear end gear pump is not intended to be limited to racing vehicle applications alone and may be used with housed gear assemblies that require cooling of the lubricant/coolant contained in such assemblies. Examples of housed gear assemblies that require cooling include gear assemblies having high torque applications, such as in four-wheel drive vehicles, and gear assemblies used in conventional automobiles and trucks that are operated at high RPM's.

Figure 2:
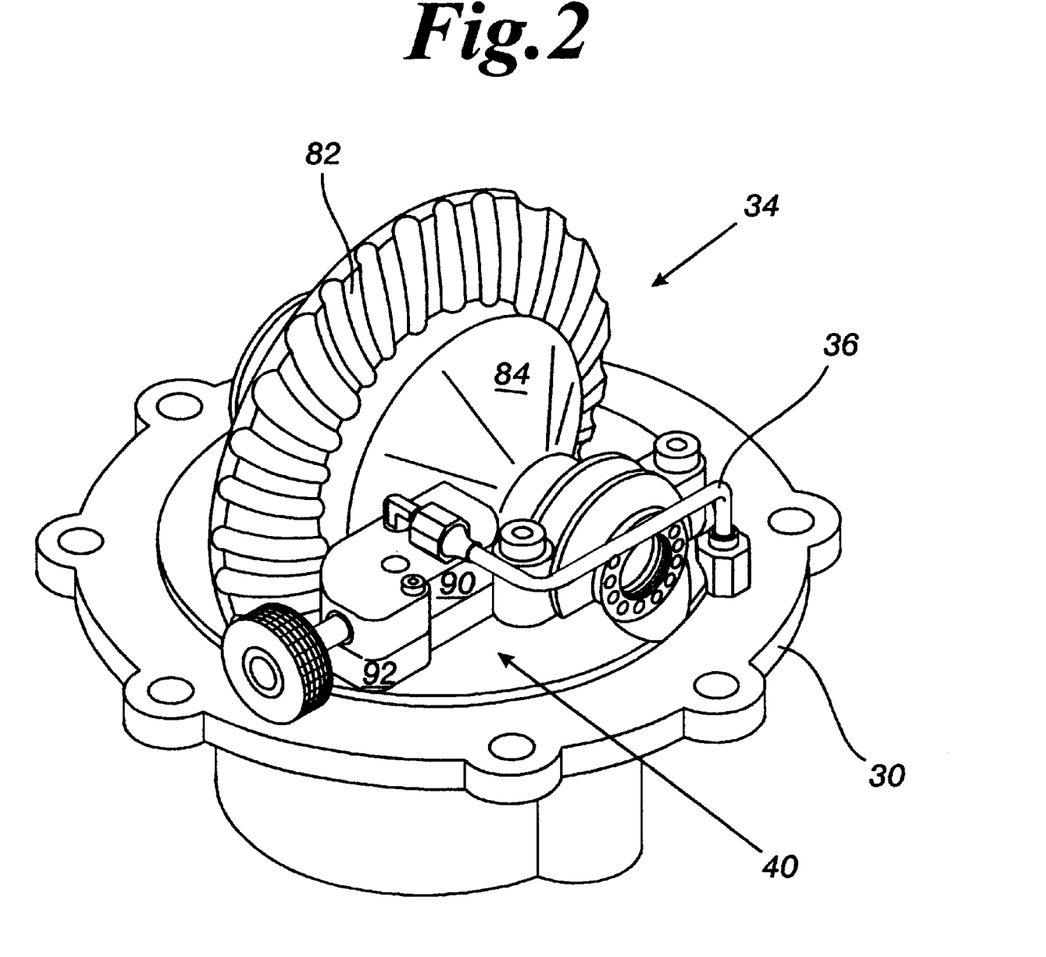
FIG. 2 is a perspective view of a rear end gear pump that is attached to the interior of a rear axle assembly in accordance with the present invention.

Referring now to the drawings, and particularly to FIG. 2, the invented rear end gear pump, shown generally at 40, is removably mountable to the interior of a rear gear assembly housing 30 and preferably engages a pinion shaft 32 (FIG. 10) of a rear gear assembly, shown generally at 34. A fluid line 36 is attached to the rear end gear pump 40 to conduct lubricant/coolant from the rear end gear pump 40 to a conventional external cooler (not shown). After the lubricant/coolant is cooled in the external cooler by heat exchange with ambient air, the lubricant/coolant is returned to the rear gear assembly 34 by conventional means, such as a return fluid line or tube that interconnects the external cooler to the rear gear assembly housing 30.

Figure 3:
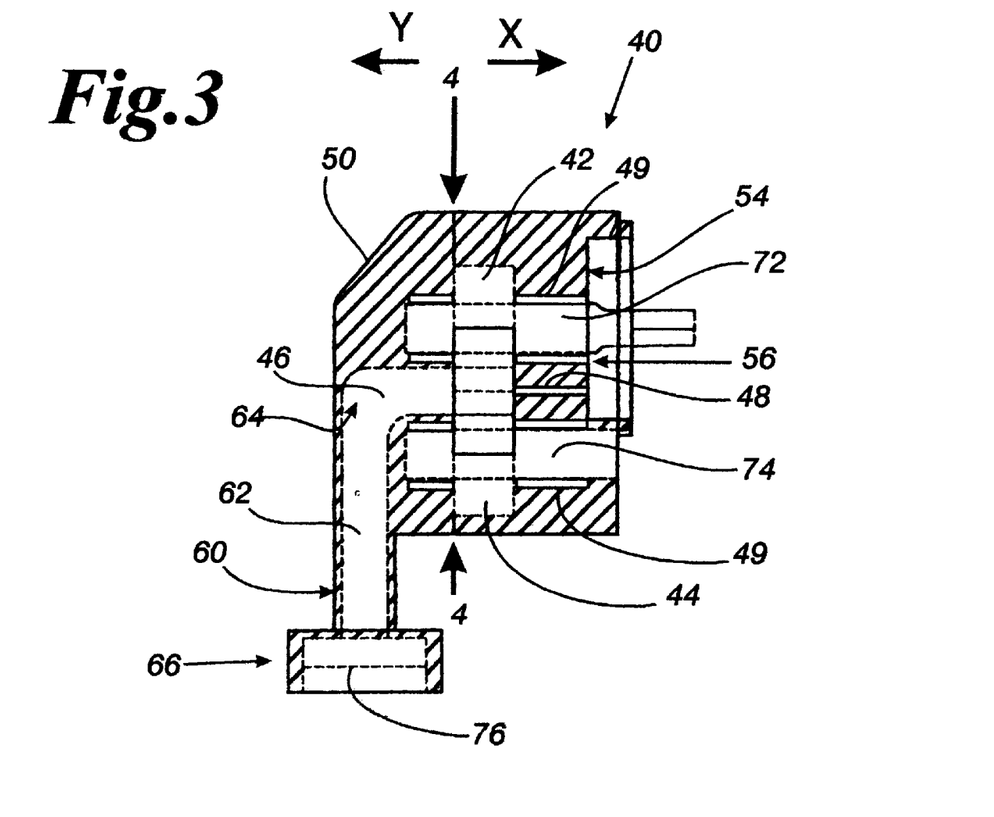
FIG. 3 is a compound sectional view of the rear end gear pump shown in FIG. 12 taken along the combination of line A—A and line A–AB pump in accordance with the present invention.

FIGS. 3 through 7 show different views of the invented rear end gear pump. FIG. 3 is a compound sectional view of the rear end gear pump 40 in accordance with the present invention. The invented rear end gear pump 40 comprises a substantially hollow pump casing 50 for removable attachment to the interior of the rear gear assembly housing 30 (FIG. 2), a pair of pump gears 42, 44 housed in and within the interior of the pump casing 50, an input port 46 formed through the hollow casing 50 for receiving lubricant/coolant into the pump 40, means for conducting lubricant/coolant into the pump, shown generally at 60, connected to the input port 46, a bearing lubrication port 48 formed in and through the pump casing 50 to provide lubrication to a back bearing (not shown) for the pinion shaft 32 (FIG. 10) and an output port 68 formed in and through the hollow casing 50 for conducting lubricant/coolant away from the pump 40. One of the pair of pump gears 42, 44 is attachable to the pinion shaft of the rear gear assembly 34 (FIG. 2). The pump gears 42, 44 are coupled together to circulate lubricant/coolant within the interior of the pump casing 50 and create a vacuum force to draw lubricant/coolant into the pump 40 and circulate the lubricant/coolant to the previously mentioned external cooler. The fluid line 36 (FIG. 2) is preferably connected to the output port 68 in order to conduct lubricant/coolant from the pump 40 to the external cooler. The lubricant/coolant is returned to the rear gear assembly housing 30 from the external cooler using conventional fluid return lines.

Figures 4, 6:
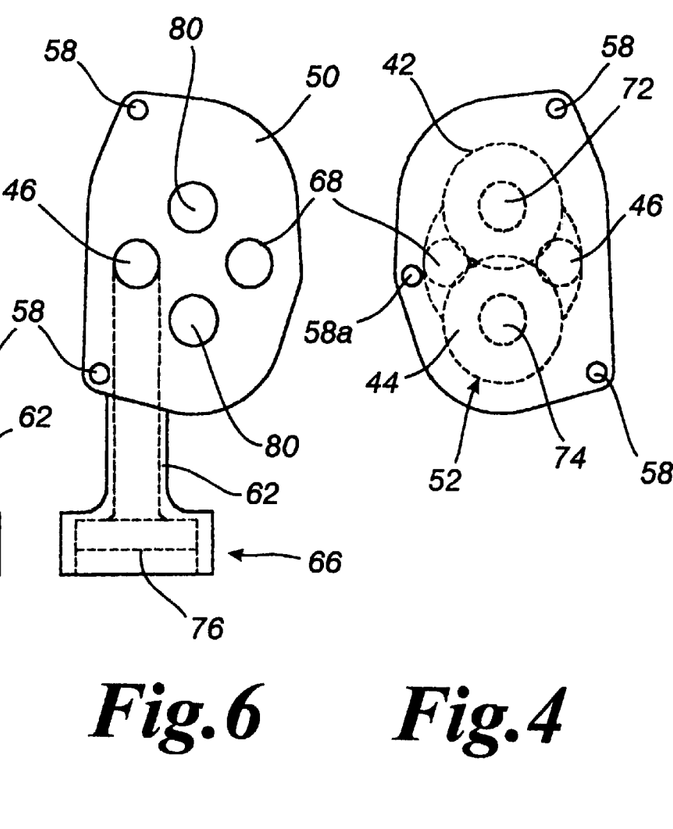
FIG. 4 is a sectional view taken along line 4—4 in the X direction of the rear end gear pump shown in FIG. 3.
FIG. 6 is a sectional view taken along line 4—4 in the Y direction of the rear end gear pump shown in FIG. 3.
Figure 5:
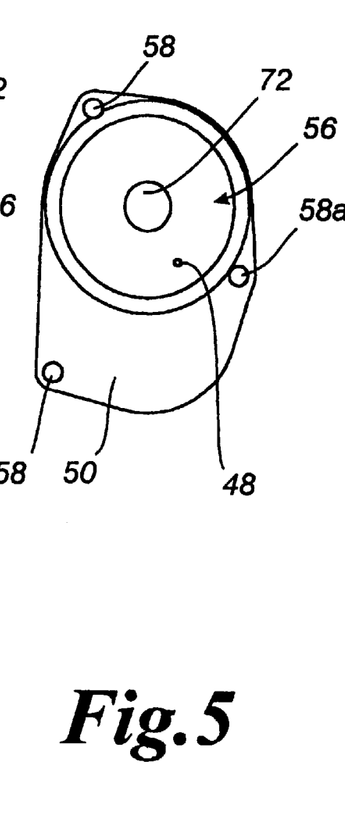
FIG. 5 is a rear view of the rear end gear pump shown in FIG. 3.
Figure 8:
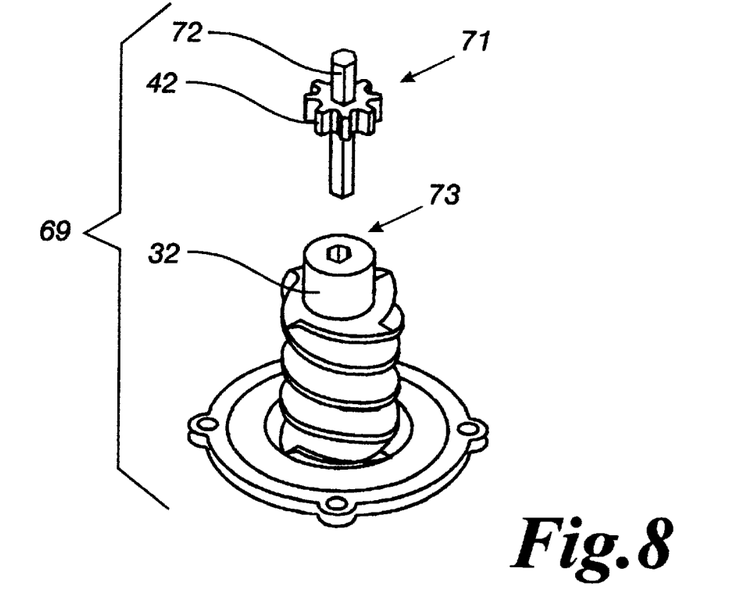
FIG. 8 is an exploded view of a drive gear and drive gear shaft for coupling with a pinion shaft in accordance with the present invention.
Figure 10:
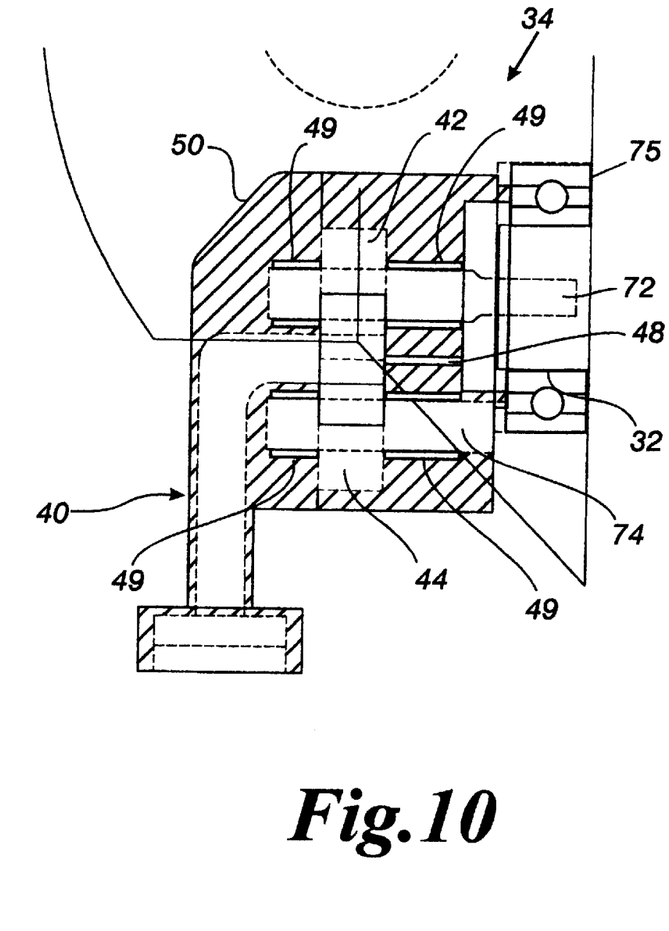
FIG. 10 is a compound view of a the rear end gear pump shown in FIG. 12 taken along the combination of line A—A and line A–AB coupled to a pinion shaft in accordance with the present invention.

FIG. 4 is a sectional view taken along line 4—4 in the X direction of the rear end gear pump 40 shown in FIG. 3. FIG. 5 is a rear view of the rear end gear pump 40 shown in FIG. 3. The pump casing 50 comprises an interior chamber, shown generally at 52, for housing the pump gears 42, 44 and channeling lubricant/coolant therethrough and a pinion shaft engaging portion, shown generally at 54, positioned adjacent to the interior chamber 52. In a preferred embodiment, a bearing index cavity, shown generally at 56, is formed on the pinion shaft engaging portion 54 for receiving the back bearing 75 of the pinion shaft 32 (FIGS. 8 and 10). The pump casing 50 includes at least two bores 58 formed therethrough to removably secure the pump casing 50 to the rear assembly housing 30 (FIG. 2).

In one embodiment of the present invention, the pump casing 50 further comprises a bottom portion 92 for directly mounting the pump 40 to the interior of the rear gear assembly housing 30 and a top portion 90 that is removably mounted onto the bottom portion 92 and securable to the rear gear assembly housing 30. The bottom portion 92 comprises at least three bores 58 for receiving mounting fasteners therethrough, such as bolts or screws. The top portion 90 comprises at least two bores 58 for receiving mounting fasteners therethrough. One of the bores 58a of the bottom portion 92 allows the bottom portion to be removably secured to the rear gear assembly housing 30. The remaining bores 58 of the bottom portion 92 and the bores 58 of the top portion 90 are preferably axially aligned in order that mounting fasteners may be received through both the top portion 90 and the bottom portion 92. Additionally, the top portion 90 may be removed from the bottom portion 92 thereby allowing access to the pump gears 42, 44 for inspection, removal or replacement.

Figure 7:
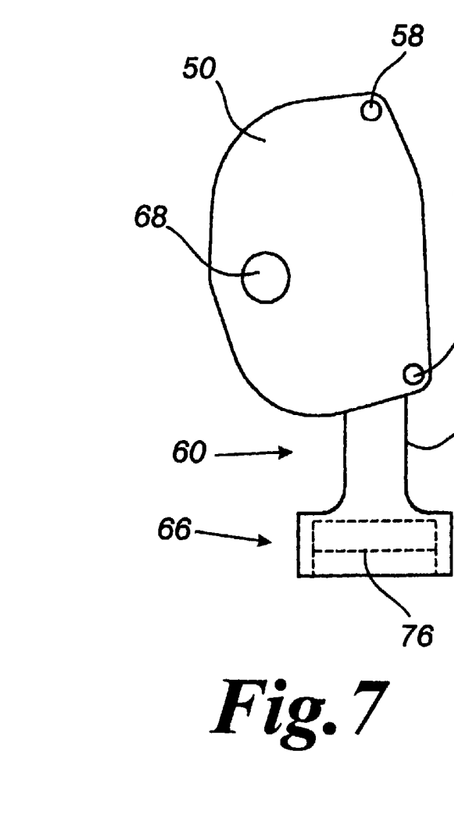
FIG. 7 is a front view of the rear end gear pump shown in FIG. 3.

FIG. 6 is a sectional view taken along line 4—4 in the Y direction of the rear end gear pump 40 shown in FIG. 3. FIG. 7 is a front view of the rear end gear pump 40 shown in FIG. 3. The pump gears 42, 44 comprise a drive gear 42 that is mounted on an input shaft 72, or drive gear shaft, for direct coupling with the pinion shaft 32 (FIGS. 8 and 10) and a driven gear 44 that is mounted on a driven gear shaft 74. The interior chamber 52 of the pump casing 50 comprises a pair of shaft bores 80 for receiving the drive gear shaft 72 and the driven gear shaft 74. The shaft bores 80 may include bearings 49 for coupling with the shafts 72, 74. FIG. 8 is an exploded view of a drive gear 42 and drive gear shaft 72 for coupling with a pinion shaft 32 in accordance with the present invention. In a preferred embodiment, one end of the drive gear shaft 72 preferably has a hex-spline 71 for coupling to the pinion shaft 32 (see also FIG. 10) which has a matching hexagonal bore 73.

Figure 9:
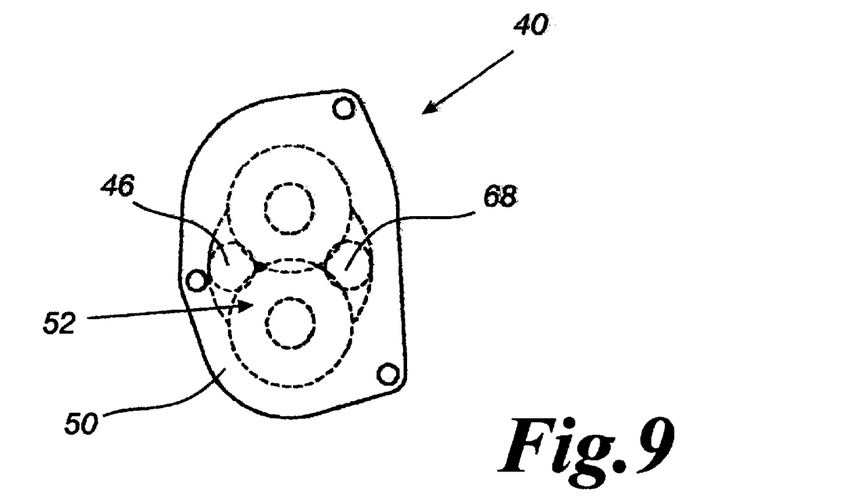
FIG. 9 is a sectional view taken along line 4—4 of FIG. 3 in the X direction of the end gear pump in accordance with the present invention illustrating the flow of fluid in the interior of the pump casing.

FIG. 9 is a sectional view of a rear end gear pump 40 in accordance with the present invention illustrating the flow of fluid in the interior of the pump casing 50. Because the drive gear 42 and the driven gear 44 are coupled together, the rotation of the drive gear 42 in one direction counter-rotates the driven gear 44 in a direction opposite the rotation of the drive gear 42. Accordingly, lubricant/coolant contained within the interior chamber 52 of the pump casing 50 tends to flow along the perimeter of the interior chamber 52 and towards the output port 68 thus creating a directional flow of lubricant/coolant through the interior chamber 52. When the pump gears 42, 44 are rotated, vacuum force urges the lubricant/coolant to leave the interior chamber 52 through the output port 68 and the bearing lubrication port 48. Because the bearing lubrication port 48 has a smaller diameter than the output port 68 and because of the location of the bearing lubrication port 48 with respect to the directional flow of lubricant/coolant, the bearing lubrication port 48 conducts less lubricant than the output port 68.

As previously mentioned, the pump gears 42, 44 are coupled together, and the drive gear 42 and driven gear 44 are preferably positioned so that they are non-tooth tolerant with respect to one another. Because the pump gears 42, 44 are not tooth tolerant, when lubricant/coolant is transported by the movement of the pump gears 42, 44 at high RPM's, the pump gears are self cleaning. For example, when the non-tooth tolerant pump gears 42, 44 operate at high RPM's, such as 8,000 to 10,000 RPM, any debris that may accumulate in between the teeth of the pump gears 42, 44 is washed out from between the teeth with the lubricant/coolant.

The means for conducting 60 lubricant/coolant into the pump 40 comprises a substantially hollow stem portion 62 having a pair of opposing ends, shown generally at 64, 66. One of the opposing ends 64 is attached to the input port 46. The other end 66 comprises a filter 76, such as a conventional screen filter, that allows lubricant/coolant to flow through the filter 76 while preventing larger sized particles from entering the pump and fouling the pump gears 42, 44. When the pump gears 42, 44 are rotated by the pinion shaft 32 (FIG. 10), the previously mentioned vacuum created within the interior chamber 52 of the pump casing 50 draws lubricant coolant into and through the conducting means 40 and into the interior chamber 52 of the pump casing 50.

The bearing lubrication port 48 is formed through the pinion shaft engaging portion 54 of the pump casing 50. The bearing lubrication port 48 provides a conduit for lubricant to flow from the interior chamber 52 of the pump casing 50 to the bearing index cavity 56 of the pinion shaft engaging portion 54. The bearing lubrication port 48 has a diameter that is generally smaller than the diameter of the input port 46 and the output port 68.

Figure 11:
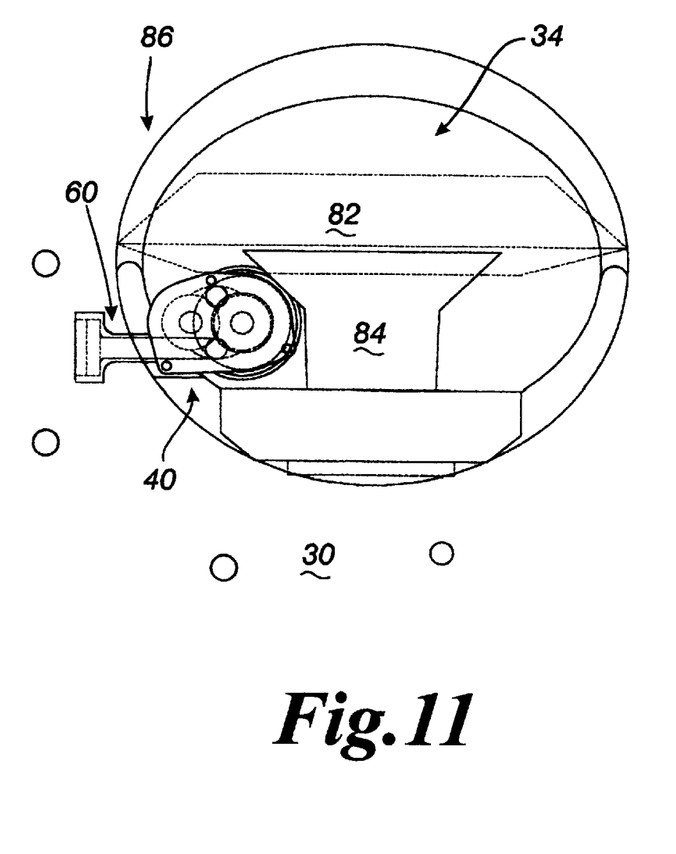
FIG. 11 is a plan view of a rear end gear pump coupled to a rear axle assembly in accordance with the present invention.
Figure 12:
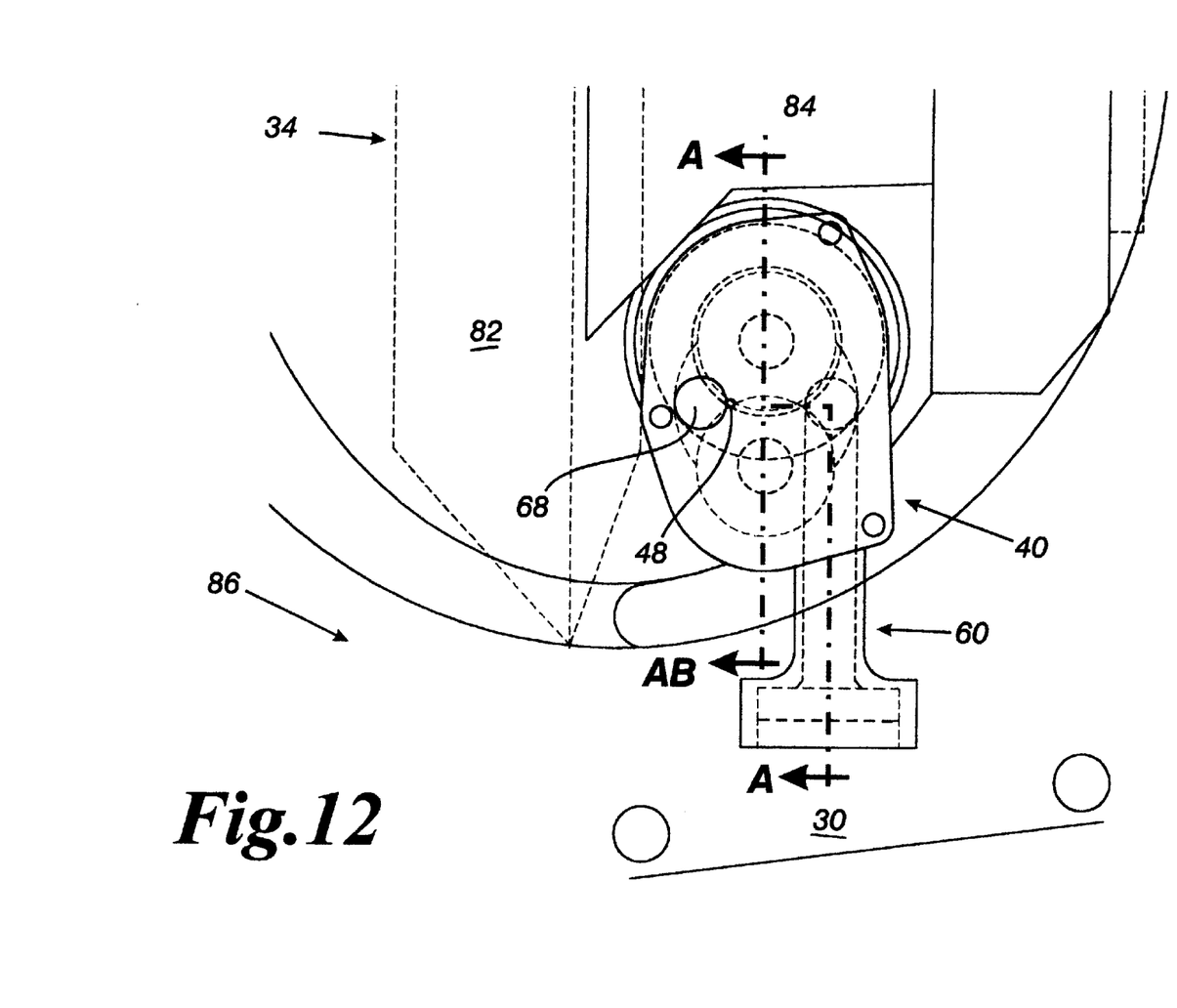
FIG. 12 is an detail view of the rear end gear pump shown in FIG. 11.

FIG. 10 is a sectional view of a rear end gear pump 40 coupled to a pinion shaft 32 in accordance with the present invention. As previously mentioned, the invented rear end gear pump 40 preferably engages a pinion shaft 32 of the rear gear assembly 34 in order that the rotation of the pinion shaft 32 actuate the rotation of the drive gear 42 in one direction. FIG. 11 is a plan view of a rear end gear pump coupled to a rear axle assembly in accordance with the present invention. FIG. 12 is an detail view of the rear end gear pump shown in FIG. 11. The rear axle housing 30 contains the rear axle assembly 34 which includes the pinion shaft 32 (FIG. 10), the pinion shaft bearing that is attached to the end of the pinion shaft, the ring gear 82 and a differential carrier 84.

In a basic operation, the invented rear gear pump draws lubricant/coolant that is located in a reservoir, shown generally at 86, of the rear axle housing 30 to the external cooler, and the lubricant/coolant returns back into the rear axle housing 30. The rear axle assembly 34 is lubricated by splash lubrication where a lower portion of a ring gear 82 is immersed in the lubricant/coolant found in the reservoir 86. As the ring gear 82 rotates, the teeth of the ring gear 82 collect lubricant/coolant and splash the lubricant/coolant about the rear axle assembly 34 and interior of the housing 30. As previously mentioned, the bearing lubrication port 48 provides lubrication to the pinion shaft bearing 75 that is attached to the pinion shaft 32 (FIG. 10).

Typically, the pinion shaft operates at about 9,000 to 10,000 RPM's and at about 740 to 760 horsepower. The invented rear end gear pump allows for lubricant/coolant to be circulated from the rear axle housing to the external cooler and back to the rear axle housing where the gear assembly is cooled by "splash" lubrication. Because the invented rear end gear pump 40 is mounted and contained in the interior of the rear axle housing 30, as best shown in FIGS. 11 and 12, the rear end gear pump 40 does not need to be removed to change the rear axle assembly 34. The invented rear end gear pump 40 allows for changing rear gear ratios during practice for racing events and during the racing events themselves with minimal down time.

EXAMPLE

The invented rear end gear pump is particularly well-suited for coupling to the rear axle housing and pinion shaft of high performance racing vehicles. For example, in NASCAR Racing which uses a differential case manufactured by Ford Motor Company, the differential case supports the back of the pinion shaft and includes a back bearing for receiving the back of the pinion shaft. The interior portion of the differential case that is located about the back bearing is preferably modified to provide a mounting surface for receiving the rear end gear pump. Additionally, bores are formed in the mounting surface of the differential case for receiving the mounting bolts or screws to secure the rear end gear pump to the differential case. The mounting surface bores are preferably axially aligned with the mounting bores of the rear end gear pump.

The pinion shaft is bored by preferably using a conventional EDM technique to mate with the drive gear shaft of the rear end gear pump. EDM boring minimizes any heat generation in the bored material and thereby minimizes altering the structural integrity of such material. The invented rear end gear pump is then mounted to the back bearing and coupled to the back of the pinion shaft.

SUMMARY OF THE ACHIEVEMENT OF THE OBJECTS OF THE INVENTION

From the foregoing, it is readily apparent that I have invented a pump for circulating lubricant/coolant to the rear axle assembly of a racing vehicle that maximizes the performance of the racing vehicle. The present invention provides a pump for circulating lubricant/coolant to the rear axle assembly of a racing vehicle that is light weight and does not require removal during race activities and gear ratio exchanges. The present invention provides a rear end gear pump that allows for changing gear ratios during practice for racing events and during the racing events themselves with minimal down time. The present invention provides a pump for circulating lubricant/coolant to the rear axle assembly of a racing vehicle that increases the fluid thermal efficiency of the pump at high operating speeds. The present invention provides a pump for circulating lubricant/coolant to the rear axle assembly of a racing vehicle that lubricates the pinion shaft bearing. The present invention provides a pump for circulating lubricant/coolant to the rear axle assembly of a racing vehicle that is internally self-cleaning.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An axle assembly lubricant/coolant gear pump for conducting lubricant/coolant out of a reservoir in an axle housing, the axle housing having a bearing for a pinion shaft, said gear pump comprising:

a hollow casing removably mountable to the interior of the axle housing, said casing defining an interior chamber;

a pair of pump gears contained within said interior chamber, said pump gears comprising:

a drive gear mounted on a drive gear shaft for coupling to the pinion shaft, said drive gear having teeth, said drive gear shaft comprising a hex-spline; and a driven gear coupled to said drive gear, said driven gear mounted on a driven gear shaft, said driven gear having teeth non-tooth tolerantly engaging said teeth of said drive gear;

an input port formed in and through said casing for receiving lubricant/coolant into said interior chamber;

means for conducting lubricant/coolant into said pump connected to said input port;

an output port formed in and through said casing for directing lubricant/coolant away from said interior chamber; and a bearing lubrication port formed in and through said casing for conducting lubricant/coolant to the bearing.

2. A gear pump in accordance with claim 1 wherein said casing further comprises:

a pinion shaft engaging portion anteriorly positioned adjacent to said interior chamber, said pinion shaft engaging portion comprising a bearing index cavity formed on the exterior of said casing for receiving the bearing.

3. A gear pump in accordance with claim 2 wherein said bearing lubrication port is formed through said bearing index cavity.

4. A gear pump in accordance with claim 1 wherein said interior chamber comprises a pair of shaft bores for receiving said drive gear shaft and said driven gear shaft, said pair of shaft bores containing bearings for coupling with said drive gear shaft and said driven gear shaft.

5. A gear pump in accordance with claim 1 wherein said conducting means comprises:

a hollow stem portion for conducting lubricant/coolant therethrough, said stem portion comprising:

an inlet end comprising a filter; and an outlet end positioned adjacent said input port.

6. A gear pump in accordance with claim 1 further comprising a fluid line connected to said output port for conducting lubricant/coolant away from said pump.

7. A gear pump in accordance with claim 1 further comprising at least two bores formed in and through said casing for removably mounting said pump to the axle housing.

8. A rear axle assembly gear pump for coupling to the interior of a rear axle housing of a rear axle assembly, the rear axle assembly comprising a pinion shaft and a back bearing coupled to the end of the pinion shaft, the rear axle housing having an outlet port, said gear pump comprising:

a hollow casing comprising a pinion shaft engaging portion;

a pair of pump gears contained in the interior of said casing, one of said pair of pump gears for coupling to the pinion shaft;

an input port formed in and through said casing for receiving lubricant/coolant into the interior of said casing;

means for conducting lubricant/coolant into said pump connected to said input port;

an output port formed in and through said casing for directing lubricant/coolant away from the interior of said casing; and a bearing lubrication port formed in and through said casing for conducting lubricant/coolant to the back bearing;

wherein said gear pump is wholly contained within the rear axle housing when said gear pump is mounted to the rear axle housing.

9. A gear pump in accordance with claim 8 wherein said pinion shaft engaging portion comprises:

a bearing index cavity formed on the exterior of said casing for receiving the back bearing.

10. A gear pump in accordance with claim 9 wherein said bearing lubrication port is formed through said bearing index cavity.

11. A gear pump in accordance with claim 8 wherein said pair of pump gears comprises:

a drive gear mounted on a drive gear shaft for coupling to the pinion shaft, said drive gear having teeth; and a driven gear coupled to said drive gear, said driven gear mounted on a driven gear shaft, said driven gear having teeth non-tooth tolerantly engaging said teeth of said drive gear;

wherein lubricant/coolant is urged to flow from said input port to said output port when said drive gear and said driven gear are rotated.

12. A gear pump in accordance with claim 11 wherein said drive gear shaft comprises a hex-spline.

13. A gear pump in accordance with claim 11 wherein said gear pump further comprises a pair of shaft bores for receiving said drive gear shaft and said driven gear shaft, said pair of shaft bores containing bearings for coupling with said drive gear shaft and said driven gear shaft.

14. A gear pump in accordance with claim 10 wherein said conducting means comprises:

a substantially hollow stem portion for conducting lubricant/coolant therethrough, said stem portion comprising:
an inlet end comprising a filter; and
an outlet end positioned adjacent said input port.

15. A gear pump in accordance with claim 8 further comprising a fluid line interconnecting said output port to the outlet port of the rear axle housing for conducting lubricant/coolant away from said pump and to an external cooler.

16. A gear pump in accordance with claim 8 further comprising at least two bores formed in and through said casing for removably mounting said pump to the axle housing.

17. A rear axle assembly lubricant/coolant gear pump for circulating lubricant/coolant of a rear axle assembly of a racing vehicle, the rear axle assembly having a rear axle housing for containing the rear axle assembly, a pinion shaft and a back bearing coupled to the end of the pinion shaft, said gear pump comprising:

a hollow casing comprising a pinion shaft engaging portion;

a pair of pump gears contained in the interior of said casing, one of said pair of pump gears for coupling to the pinion shaft;

an input port formed in and through said casing for receiving lubricant/coolant into the interior of said casing;

means for conducting lubricant/coolant into said pump connected to said input port;

an output port formed in and through said casing for directing lubricant/coolant away from the interior of said casing; and a bearing lubrication port formed in and through said casing for conducting lubricant/coolant to the back bearing.

18. A gear pump in accordance with claim 17 wherein said pinion shaft engaging portion comprises a bearing index cavity formed on the exterior of said casing for receiving the back bearing; and wherein said bearing lubrication port is formed through said bearing index cavity.

* * * * *